Figure 13:
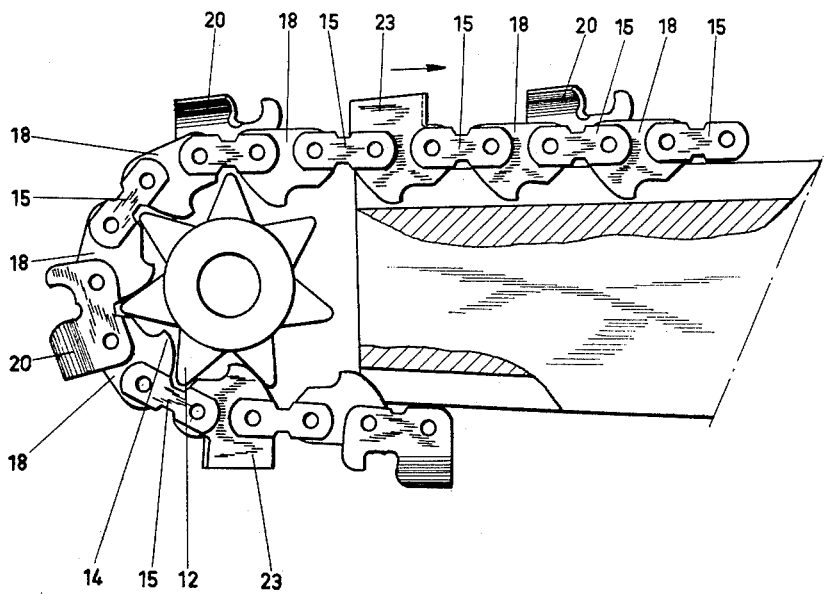

Dec. 4, 1962 E. G. N. WINNLERT ETAL 3,066,711
SAW CHAIN
Filed March 30, 1959 3 Sheets-Sheet 1
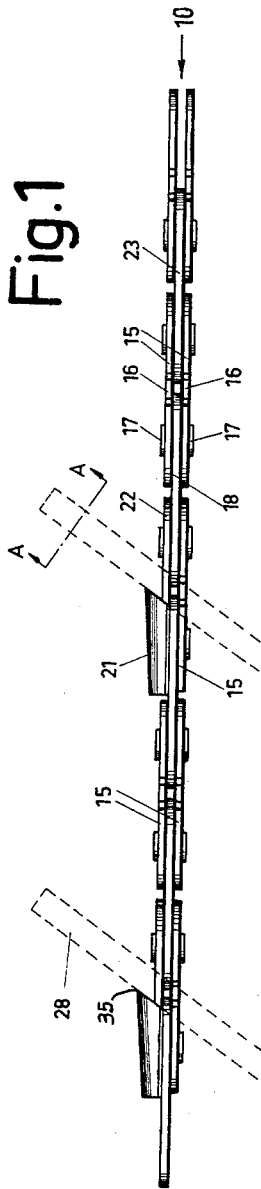
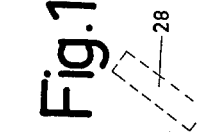
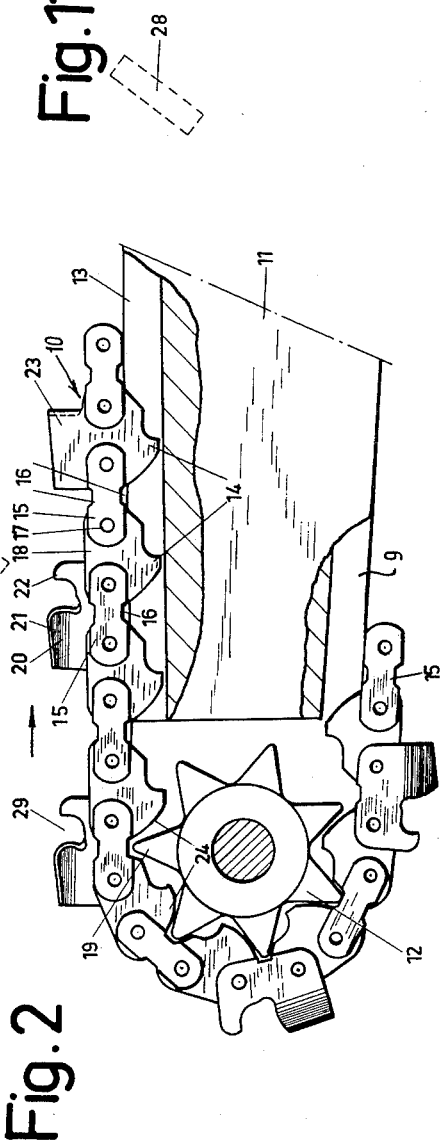
INVENTORS
ERIK G. N. WINNLERT
HANS H. DE GEER
BJORN T. BERGGREN
BY
Curtis, Morris & Safford
ATTORNEYS

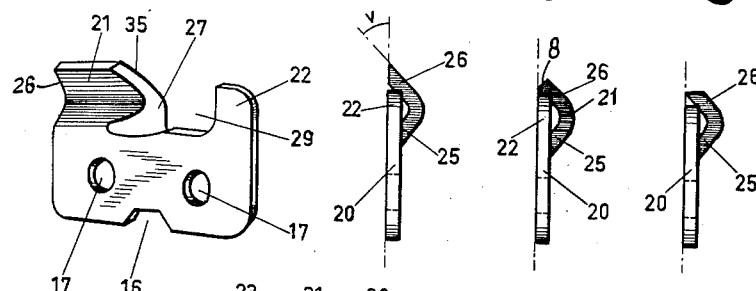
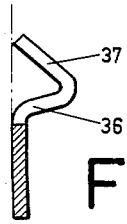
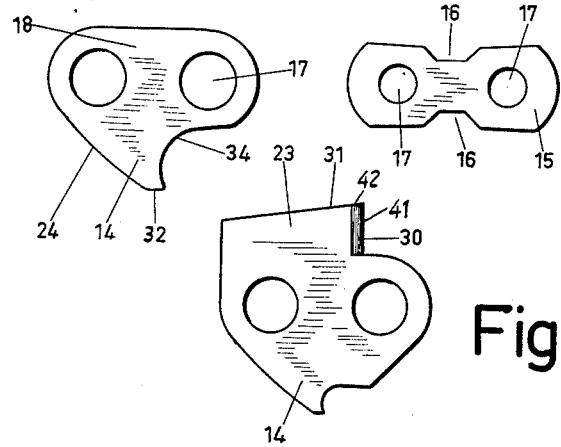

Dec. 4, 1962    E. G. N. WINNLERT ETAL    3,066,711
SAW CHAIN
Filed March 30, 1959    3 Sheets-Sheet 3

INVENTORS
ERIK G. N. WINNLERT
HANS H. DE GEER
BJORN T. BERGGREN
BY
Curtis, Morris & Safford
ATTORNEYS United States Patent Office 3,066,711
Patented Dec. 4, 1962

3,066,711
SAW CHAIN
Erik Gunnar Napoleon Winnlert, Hans Holmar De Geer, and Bjorn Thorstensson Berggren, Sandviken, Sweden, assignors to Sandvikens Jernverks Aktiebolag, Sandviken, Sweden, a corporation of Sweden
Filed Mar. 30, 1959, Ser. No. 802,989
Claims priority, application Sweden Apr. 9, 1958
10 Claims. (Cl. 143—135)

This invention relates to saw chains formed of pivoted, interconnected links; and, more in particular to saw chains having driving links by which the chain is driven over a sprocket around the periphery of a supporting guide bar.

Saw chains with L-shaped and similarly formed cutting teeth have been manufactured in which the cutting teeth are separate links. Some such cutting teeth have shank portions to which are attached toe portions which extend back over the links. Each toe portion extends on both sides of the central part of its link, and a cutting edge is formed at the front edge of the toe and shank portion, in some instances by means of a cylindrical file so that the cutting edge is in the form of an arc or a spiral. Such chains have proven successful, but the cutting capacity is somewhat limited, refiling is difficult, and it is usually necessary to adjust them by special tools.

An object of the present invention is to overcome the problems encountered in the prior types of saw chains. Another object is to provide saw chains which are superior in every respect. In accordance with one aspect of the present invention, a saw chain is provided having links with unique slicing teeth. Each of said links consists of a central plane portion and a cutting portion extending from said plane portion, and the cutting portion consists of a shank and a toe portion. The shank portion extends away from the central plane of the link and also away from the center of the chain, and the toe portion extends back to the central plane portion.

In the illustrative embodiments of the invention, the toe portion extends at an angle of less than 90° to the central plane portion. In such a saw chain, the toe has a suitable chip angle so as to give maximum cutting capacity, and yet it requires minimum driving power.

In the drawings:
FIGURE 1 is a top plan view of a saw chain constituting one embodiment of the invention;
FIGURE 2 is a fragmentary side elevation of the end of the cutting bar of a chain saw with the saw chain of FIGURE 1 installed and forming an operating part of the saw;
FIGURE 3 is a perspective view of one of the cutting tooth links of the saw chain of FIGURES 1 and 2;
FIGURES 4, 5 and 6 are end views of various illustrative embodiments of the slicing-tooth links, the embodiment of FIGURE 5 being that of FIGURES 1 to 3, inclusive.
FIGURES 7 and 10 are side elevations of illustrative embodiments of the slitting teeth links;
FIGURE 8 is a side elevation of a centrally disposed drive link;
FIGURE 9 is a side elevation of a side plate or link;
FIGURE 11 is a representation on the line A—A of FIGURE 1;
FIGURE 12 is a sectional view and another embodiment of the slicing tooth link; and,
FIGURE 13 is a view similar to FIGURE 2, but showing another embodiment of the invention.

Referring to FIGURES 1 and 2 of the drawings, saw chain 10 is driven around a saw guide plate 11, and thence over a motor driven, toothed-sprocket wheel 12. Saw chain 10 is formed by a series of central links interconnected by pairs of side links, the series being a central link, a pair of side links, a central link, a pair of side links, etc. The links are interconnected by rivets 7 which are snugly received in holes 17 in the various links. The center links are of two types: driving links 18 and slitting-tooth links 23. Each of the center links has an integral root portion 14, by which the chain is guided and driven. The side links are also of two types, there being the somewhat rectangular side plates 15 and slicing-tooth links 20. The side links 15 are notched above and below at 16, and are rounded at their ends. Each of the slicing tooth links 20 includes a slicing tooth 21 and a depth gauge 22. In this embodiment, all of the slicing-tooth links are identical in general configuration, but there are right-hand and left-hand cutting links; that is, a left-hand slicing tooth link is shown in FIGURES 3 and 5, and the right-hand slicing tooth links are identical, except that the slicing tooth extends from the other side of the link plate and the cutting edge is upon the other side. As shown in FIGURES 1 and 2, the slicing tooth links are positioned in groups of four links each, there being a pair of left-hand slicing links followed by a right-hand slicing-tooth link. Each of these groups is separated from the next by a slitting-tooth link 23.

Referring now to FIGURES 3 and 5, the slicing tooth 21 on each slicing-tooth link has a shank or base portion 25 which projects outwardly (to the right in FIGURE 1) from the plane of the link plate, and a toe portion 26 which projects back to the plane of the opposite side of the link plate. The toe portion 26 is at an angle of 45° to the side planes of the link plate which are parallel to the central plane of the chain, and the extreme end of the toe portion has a transverse end surface 8 which is also at an angle of 45° of these planes. Each of the slicing teeth 21 is sharpened by filing to form a flat surface 27 which, in this embodiment, is at an angle of 55° to the center plane of the chain. The filing is performed by a file 28 shown in broken lines. Referring again to FIGURE 3, the slicing tooth has a cutting edge 35 which extends in a continuous curve throughout the base or shank of the slicing tooth and the toe portion. Referring again to FIGURE 1, this cutting edge defines the extremity of the saw chain and slices away the wood to form one side wall and a portion of the bottom of the groove.

The slitting-tooth links 23 of the embodiment of FIGURES 1 and 2 are of the type shown in FIGURE 10 with a root portion 14, and a slitting tooth 31 having a cutting edge 41 formed by sharpening to produce a flat surface 30. There is also an angular bottom cutting edge 42 at the joined edges of surface 30 and the top surface of the slitting tooth. The slitting tooth of FIGURE 10 is a left-hand slitting tooth, and there are right-hand slitting teeth which are identical, except that their cutting edges are at the opposite side of the links. In the illustrative embodiments of the saw chain of the present invention, the right-hand and left-hand slitting teeth are alternated. That is, considering the slitting teeth without regard to slicing teeth, the slitting teeth are in the order: right-hand, left-hand, right-hand, left-hand, etc. The slitting teeth are tapered so as to recede from the leading cutting edge 42. For some embodiments of the invention, certain or all of the slitting tooth links are of the form shown in FIGURE 7, having no root portion 14. The slitting teeth 31 are of such heighth or transverse dimension as to cut wood to form the central portion of the bottom of the groove. During operation, the slicing teeth cut two side grooves leaving a slight ridge between them, and the slitting teeth remove these ridges.

Referring again to FIGURE 2, a segmental portion of the saw chain is shown installed upon a guide plate 11 of a chain saw. Guide plate 11 has a groove 13 along its top edge, and a similar groove 9 along its bottom edge. The roots 14 of the various links are snugly received in and slide along these grooves, while the side links 15 and 20 rest upon and slide along the guide plate at the sides of the grooves. Thus, the chain is held erect and firm, and it is driven in the direction indicated by a motor at the opposite end of the guide plate.

It should be noted that, in the embodiment of FIGURE 1, each of the center links has a root portion 14. Hence, each of the slitting teeth 23 is supported by four of the side links upon the edges of the guide plate at the side of the groove into which its root extends. At the same time, the integral root portion holds the tooth in exact alignment. Therefore, the slitting teeth are very effective in their action. Each of the slicing teeth is held by two adjacent center links 18, so that it slides evenly along the guide surface. Its depth gauge 22 is accurately positioned with respect to its cutting edge so as to provide the proper depth of cut. Satisfactory leeway is provided to permit easy operation, and yet each tooth performs its proper functions. As shown in FIGURE 8, each of the root portions has a somewhat flattened and tapered rear edge surface and a scoop-like forward edge which carries any accumulated chips from the grooves in the guide plate.

In the embodiment of FIGURE 13, the links are identical with those of FIGURES 1 and 2. However, the tooth order is different, and there is one slitting tooth between each pair of slicing teeth and the next. The order of teeth is as follows: a right-hand slitting tooth, a left-hand slicing tooth, a right-hand slicing tooth, a left-hand slitting tooth, a right-hand slicing tooth, a left-hand slicing tooth, a right-hand slitting tooth, etc. This embodiment of the invention operates generally similar to that of FIGURES 1 and 2, but the alternate right and left-hand teeth has special advantages for some types of wood and some conditions of operation. It should be noted that, considering slitting teeth alone, they are alternated right and left, in both FIGURES 2 and 13. Likewise, when considering slicing teeth alone in each embodiment, there are two right-hand slicing teeth and then two left-hand slicing teeth.

It has been pointed out above, that the slicing tooth of FIGURES 3 and 5 has its toe portion 26 at an angle of 45° to the side planes of the link and the central plane of the saw chain. In the links of FIGURES 4, 6 and 12, the toe portions are illustrated as extending at this same angle which is represented by the angle V of FIGURE 4. In FIGURE 4, the end of the toe portion is sharpened in the plane of the left-hand side of the link plate, thus to form a sharp point on the end of the toe. In the link of FIGURE 6, the toe portion is sharpened into a plane at right angles to the planes of the sides of the link plate, thus to provide a transverse cutting edge. The invention contemplates that this cutting edge may be inclined at an angle which may be up to 20°. In the embodiment of FIGURE 12, the shank portion 36 extends substantially transversely away from the link plate, and the toe portion 37 is of substantially greater length than in FIGURE 5. The curved portion connecting the shank 36 and the toe portion 37 is more clearly defined and has substantial strength. A chain having slicing teeth of the type of FIGURE 12 is quite rugged and forms a wider groove. Each of the types of teeth of the illustrative embodiments has special advantages and uses. The invention contemplates that the angle between the toe portion and the central plane of the saw chain shall be between 10° and 60°, preferably between 30° and 45°. The receding angle of the cutting teeth which is the angle of inclination of the top edges of the teeth, as shown in FIGURES 3, 7 and 10 is preferably between 3° and 8° and, at all times, between 0° and 15°. The slicing teeth 21 have decreasing width rearwardly, so that clearance is provided beyond each slicing edge. Under some circumstances, the depth gauge is "set." That is, bent from the plane of the center links. For example, the depth gauge may extend ½ mm. toward the median plane. The length of each slicing tooth is greater than one-half the length of the slicing tooth link.

Under some circumstances, the slitting teeth may be omitted, in which case thin, center links 18 are provided. The slitting teeth are preferably unset (flat). The cutting edge is formed by filing or grinding at an angle from 0° to 45°, preferably between 20° and 25°.

We claim:
1. A saw chain comprising, pivotally interengaged links including slicing tooth links and slitting-tooth links, said slicing-tooth links each having a central plate portion and a slicing tooth, each of said slicing teeth consisting of a shank portion extending at an angle from said central plate portion and away from the central plane of the saw chain and a toe portion integral with said shank portion and projecting toward the plane of the opposite side of said plate portion and not extending through said plane, said toe portion extending at an angle of substantially less than 90° with respect to the central plane of the saw chain, said slitting tooth links being substantially flat and each having its central plane substantially in the central plane of the saw chain.

2. A saw chain in accordance with claim 1, wherein said angle of substantially less than 90° is of the order of 30° to 60°.

3. A saw chain in accordance with claim 2, wherein said angle is of the order of 45°.

4. A saw chain in accordance with claim 1, wherein said slicing portion of each of the slicing teeth has a cutting edge extending rearwardly and toward the median line of the saw chain, said cutting edge being formed by a plane-filed surface at said forward border.

5. A saw chain in accordance with claim 1, wherein said slicing teeth are positioned respectively on the left-hand and right-hand sides of the saw chain, there being two slicing teeth on the left-hand side, two on the right-hand side, two on the left-hand side, etc.

6. A saw chain in accordance with claim 1, wherein said links consist of center links and pairs of side links with the links of each pair being arranged side-by-side and with successive pairs of links alternating with center links, said pairs of links joining center links, certain of said center links being said slitting tooth links each having an integral slitting tooth in the median plane of the chain.

7. A saw chain in accordance with claim 6, wherein there are right-hand and left-hand slicing teeth and right-hand and left-hand slitting teeth which are positioned serially in the saw chain in the following order: a first slicing tooth, a first slitting tooth of the opposite hand of said first slicing tooth, a second slicing tooth identical with said first slicing tooth, a third slicing tooth of the opposite hand of said first and second slicing teeth, a second slitting tooth of the opposite hand of said first slitting tooth, a fourth slicing tooth identical with said third slicing tooth, a fifth slicing tooth of the opposite hand of said fourth slicing tooth.

8. A saw chain in accordance with claim 6, wherein there are right-hand and left-hand slicing teeth and right-hand and left-hand slitting teeth which are positioned serially in groups along the saw chain with the teeth in each group being in the following order: a right-hand slicing tooth, a left-hand slitting tooth, a right-hand slicing tooth, a left hand slicing tooth, a right-hand slitting tooth, a left-hand slicing tooth.

9. A saw chain comprising, pivotally interengaged links consisting of center links and pairs of side links with the links of each pair being arranged side-by-side and with successive pairs of links alternating with center links and with each of said pairs of links joining two center links, certain of said center links being slitting-tooth links each having an integral slitting tooth in the median plane of the chain, certain of said side links being slicing-tooth links each having a central plate portion and a slicing tooth, each of said slicing teeth consisting of a shank portion extending at an angle from said central plate portion and a toe portion integral with said shank portion and projecting toward the plane of the opposite side of said plate portion and not extending through said plane, said toe portion extending at an angle of substantially less than 90° with respect to said plane, each of said slitting teeth extending transversely substantially between the inner side planes of the plate portions of said slicing-tooth links.

10. A saw chain comprising, pivotally interengaged links consisting of center links and pairs of side links with the links of each pair being arranged side-by-side and with successive pairs of links alternating with center links and with each of said pairs of links joining two center links, certain of said center links being slitting-tooth links each having an integral slitting tooth in the median plane of the chain, certain of said side links being slicing-tooth links each having a central plate portion and a slicing tooth, each of said slicing teeth consisting of a shank portion extending at an angle from said central plate portion and a toe portion integral with said shank portion and projecting toward the plane of the opposite side of said plate portion and not extending through said plane, said toe portion extending through said plane, said toe portion extending at an angle of substantially less than 90° with respect to said plane, said slitting teeth having cutting edges parallel with the median plane of the saw chain and alternatively on the right-hand and left-hand sides of said median plane, each of said slitting teeth sloping rearwardly from its cutting edge.

References Cited in the file of this patent

UNITED STATES PATENTS

| | | |
|---|---|---|
| 2,565,502 | Johanson | Aug. 28, 1951 |
| 2,755,828 | Dunnington | July 24, 1956 |
| 2,788,811 | Bernard et al. | Apr. 16, 1957 |
| 2,792,035 | Aumann | May 14, 1957 |
| 2,832,380 | Crowe | Apr. 29, 1958 |
| 2,854,041 | Siverson | Sept. 30, 1958 |
| 2,989,096 | Irgens | June 20, 1961 |

FOREIGN PATENTS

| | | |
|---|---|---|
| 515,241 | Canada | Aug. 2, 1955 |

UNITED STATES PATENT OFFICE
CERTIFICATE OF CORRECTION

Patent No. 3,066,711 December 4, 1962

Erik Gunnar Napoleon Winnlert et al.

It is hereby certified that error appears in the above numbered patent requiring correction and that the said Letters Patent should read as corrected below.

Column 6, line 3, strike out "portion extending through said plane, said toe".

Signed and sealed this 11th day of June 1963.

(SEAL)
Attest:

ERNEST W. SWIDER
Attesting Officer

DAVID L. LADD
Commissioner of Patents